Feb. 21, 1961    P. H. BEKS    2,972,200
PRESSING OR IRONING MACHINE FOR TEXTILE ARTICLES
Filed March 6, 1959

INVENTOR.
PETRUS H. BEKS
BY
ATTORNEY

United States Patent Office 2,972,200
Patented Feb. 21, 1961

2,972,200

PRESSING OR IRONING MACHINE FOR TEXTILE ARTICLES

Petrus H. Beks, 13 Van de Pollstraact, Vught, Netherlands

Filed Mar. 6, 1959, Ser. No. 797,622

Claims priority, application Netherlands Mar. 12, 1958

6 Claims. (Cl. 38—5)

The invention relates to a pressing or ironing machine for textile articles, comprising a conveyor belt for supplying articles to a pressing or ironing apparatus or removing them therefrom. A machine of this kind is known from the Dutch patent specification 79,029. With such a machine the articles lying on the conveyor belt are brought in contact with the pressing head of the pressing machine. This pressing head engages only the top side of the articles lying on the conveyor belt, so that the bottom side is not treated or only in an insufficient way. It follows that some articles, especially pillowcases, must be turned by the personnel so as to cause them to pass the pressing machine once more. In consequence thereof the treatment of pillow cases and similar articles is expensive, and the capacity of the machine is reduced to one half. The object of the invention is to obviate these drawbacks.

The machine according to the invention is characterised in that the conveyor belt consists of a number of parallel portions disposed side by side, said portions being arranged some distance apart from each other, a turning or delivery mechanism being arranged behind the pressing apparatus and containing a number of swingable bars, which are swung through the interspaces of said portions for turning or removing the articles. In this way is achieved that the treatment of articles like pillow cases does not entail high expenses for wages and that a great working capacity of the machine is obtained.

A suitable embodiment of the machine is characterised in that in the direction of movement of the conveyor belt two pressing or ironing apparatuses are disposed some distance behind each other and between these apparatuses the mechanism for automatically turning the articles is provided.

Although the conveyor belt can also be driven continuously, an intermittently movable belt is preferred in view of the working of the turning mechanism. The preferably automatic control and driving of the conveyor belt and pressing apparatuses can be suitably effected by pneumatic or hydraulic means.

The invention will now be elucidated with reference to an example of execution represented in the drawing.

Figure 2:
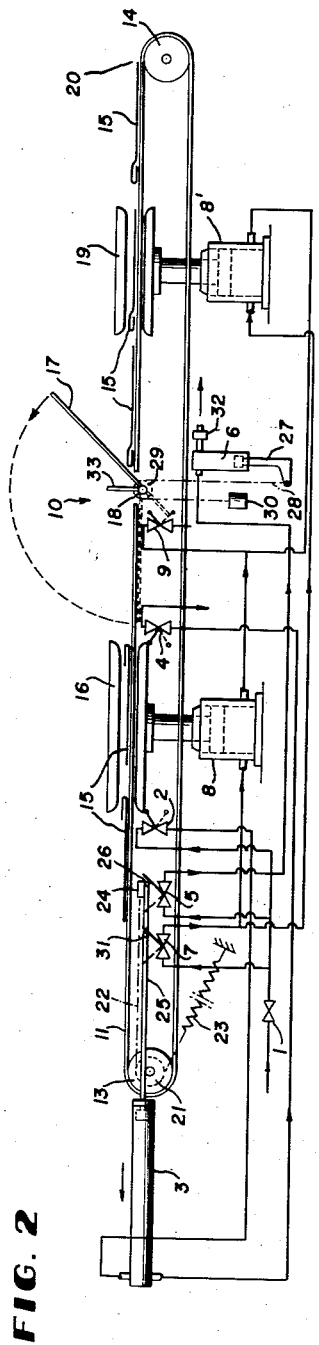
Figs. 1 and 2 show each a side elevation of a machine according to the invention in different working conditions.
Figure 3:
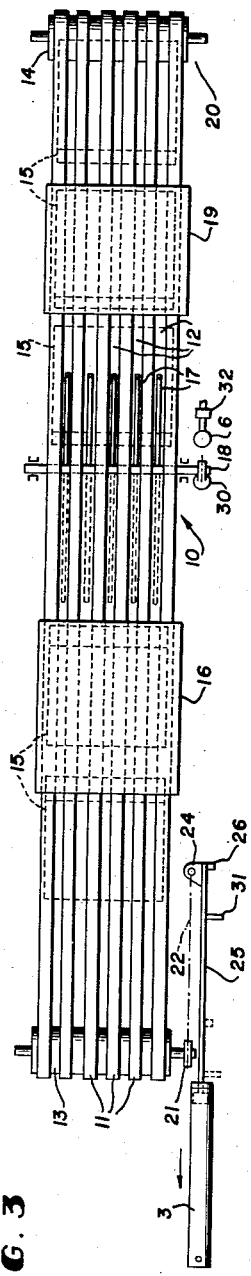
Fig. 3 shows a plan view in connection with Fig. 2.

In the example of execution represented in the drawing the textile articles, in particular pillow cases, are placed on the left hand extremity of the conveyor belt 11 consisting of a number of parallel portions separated by mutual interspaces 12. The portions are guided over a guiding roller 13 and a turning roller 14. By means of the conveyor belt 11 the pillow cases 15 are first led to a pressing apparatus 16, the lower pressing plate of which can be pressed against the upper pressing plate by means of a pneumatic pressing cylinder 8. The upper pressing plate is held at the required high temperature, e.g. by means of steam or an electric heating element.

Figure 1:
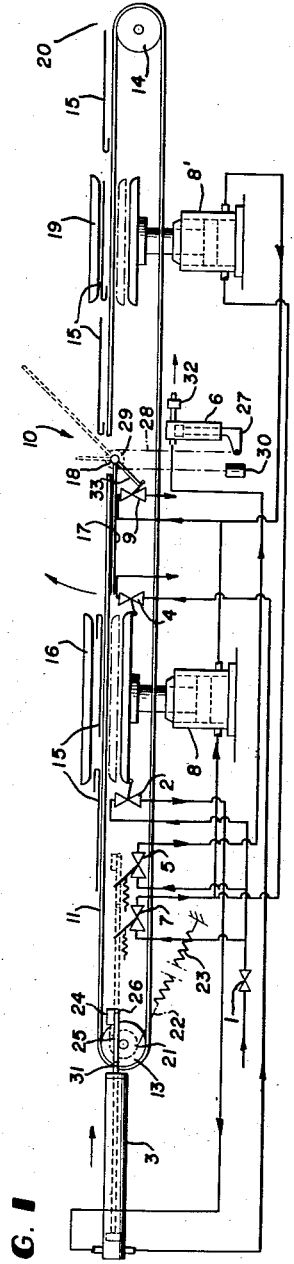

After the upper side of the pillow case 15 has been treated by pressing it against the upper pressing plate of the pressing apparatus 16, the pillow case is conveyed to the turning mechanism 10, which is provided with a number of swingable bars 17 which are lying, in the resting position indicated in Fig. 1, at the left hand side of the axis of rotation 18 beneath the conveyor belt 11 and are swung to the right when a pillow case is being turned, so that this time the pillow case comes to lie on the conveyor belt in a reversed position at the right hand side of the axis of rotation 18, as indicated in Fig. 2. The bars 17 are thereby passing through the interspaces 12 between the portions of the conveyor belt 11. This conveyor belt then moves the pillow case then to a delivery table (not shown in the drawing) or if desired to the pressing apparatus 19, which is carried out in a similar way as the pressing apparatus 16 and is operated by a pneumatic pressing cylinder 8'.

After the other side of the pillow case has been pressed said pillow case is moved by the conveyor belt towards the discharge end 20 where it is removed from the machine, either automatically or by hand.

The conveyor belt 11 and the pressing apparatuses 16, 19 are operated and driven pneumatically by means of the elements 1 to 10. The machine is started and stopped by means of the hand operated valve 1 connected to the feeding conduit of the compressed air. When the valve 1 is opened the machine occupies the position indicated in Fig. 1, while the lower pressing plates of the pressing apparatuses 16 and 19 are in their lowermost position. The valve 2 is then opened and the valve 4 is closed, so that through valve 2 compresser air is led to the pressing cylinder 3 for the intermittent movement of the conveyor roller 13 of the conveyor belt 11. This conveyor roller 13 is driven by means of a sprocket wheel over which a chain 22 is passed, one end of which is connected with the one end of a spring 23, of which the other end is connected with a fixed point of the machine, whilst the other end of the chain 22 is rigidly connected with the extremity 24 of the piston rod 25 of the pressing cylinder 3.

When the piston rod 25 is moved to the right a cam 26 abuts first against the arm for operating the valve 5, by means of which compressed air is admitted to the pressing cylinder 6, of which the piston rod 27, by means of a chain 28 and a sprocket wheel 29, swings the axis 18 of the turning mechanism with the bars 17 into the extreme right hand position. The chain 28 is at its free end strained by a load 30. A cam 31 provided on the piston rod 25 abuts, a short time after the cam 26, against the arm for operating the valve 7, through which at the same time compressed air is supplied to the pressing cylinder 8 of the pressing apparatus 16 and the pressing cylinder 8' of the pressing apparatus 19. The lower pressing plates of the pressing apparatuses 16 and 19 are hereby moved upwards until they occupy the position indicated in Fig. 2. This position is maintained for some time due to the influence of a throttle valve 32 of the pressure cylinder 6.

When the pressing plate of the pressing apparatus 16 is moved upwards the valves 2 and 4 are reversed so that the compressed air supply to the pressing cylinder 3 is interrupted by means of the valve 2, which cylinder is connected with the atmosphere by means of the valve 4, so that, under the influence of the spring 23, the chain 22 is pulled back until it reaches the position indicated in Fig. 1 while the sprocket wheel 21 is being returned to its initial position, without, however, during this movement taking along the conveyor 11 due to the presence of a freewheel mechanism.

During this movement the valves 5 and 7 are closed so that the supply of compressed air to the cylinders 6, 8 and 8' is interrupted. As the valve 9 is in closed position, the cylinders 8 and 8' will, for the time being, remain under pressure, but the pressure in the cylinder 6 will recede gradually due to the presence of the adjustable throttle valve 32. Under the influence of the load 30 the piston rod 27 can thus be lifted up, so that the turning mechanism with the bars 17 returns gradually to the position of Fig. 1. In this position the arm 33 of the axis 18 opens the valve 9, whereby the cylinders 8 and 8' are put into communication with the atmosphere, so that the lower pressing plates of the pressing apparatuses 16 and 19 return to their lowermost position under the influence of their own weight. In this position, which is indicated in Fig. 1, the valve 2 is opened and the valve 4 is closed, so that fresh compressed air is admitted to the pressing cylinder 3, after which the described operations are repeated.

What I claim is:

1. A pressing device for pressing both sides of a textile article at a plurality of stations, comprising spaced first and second pressing means, conveyor means for moving articles to a first pressing station in alignment with said first pressing means adapted to press one side of each article and then to a second pressing station in alignment with said second pressing means adapted to press the other side of each article, said conveyor means including a plurality of longitudinally extending portions transversely separated from each other, means disposed along said conveyor means and between said first and second pressing means for turning the articles over and including a turning member disposed trasversely of the conveyor means and having a number of bars connected thereto which extend longitudinally of the coveyor means and are in alignment with the spaces between conveyor portions, means for moving said turning member between a position where the bars extend toward the oncoming articles and are disposed at their outer ends slightly below the article supporting surface of the conveyor means to a position spaced substantially 180° therefrom whereby the articles are turned over to prepare them to have their other sides pressed by said second pressing means.

2. The pressing device of claim 1 wherein said conveyor means and said first and second pressing means include and are actuated by first, second, and third fluid motors respectively, said moving means including a fourth fluid motor, a source of fluid pressure, means communicating said source with said fluid motors, a manually operable fluid valve interrupting said communicating means for starting and stopping operation by opening and closing said communicating means, a first normally closed valve interrupting said communicating means between the manually operable valve and the fourth fluid motor, the first fluid motor being connected to said manually operable valve to operate the conveyor means when said valve is open, said first valve being disposed in the path of said conveyor means to be opened upon movement thereof to connect said fourth fluid motor with the pressure source and thereby actuate said turning means, a second normally closed valve interrupting said communicating means between the manually operable valve and the second and third fluid motors, said second valve being disposed in the path of said conveyor means to be opened thereby upon further movement thereof to connect said second and third fluid motors with the pressure source and thereby actuate said pressing means, a third normally open valve interrupting said communicating means between the manually operable valve and the first fluid motor, means connecting said first fluid motor with the atmosphere, a fourth normally closed valve interrupting said connecting means, said third and fourth valves being disposed in the path of said pressing means to be closed and opened respectively upon movement thereof to relieve said first fluid motor of pressure and permit retraction thereof thereby closing said first and second valves, a throttle device operatively associated with said fourth fluid motor to assure that said motor retracts slowly, relief means for connecting said second and third motors with the atmosphere, and a fifth normally closed valve interrupting said relief means and disposed in the path of said turning means to be operated thereby.

3. The pressing device of claim 2 comprising two counterweight means connected to said first and fourth fluid motors to retract same when they communicate with the atmosphere.

4. The pressing device of claim 1 comprising automatic means operating said device to intermittently actuate said conveyor means, said pressing means, and said moving means.

5. The pressing device of claim 4 wherein said automatic means includes first control means for initiating operation by actuating said conveyor means, second control means responsive to actuation of said conveyor means to actuate said moving means and said pressing means, third control means responsive to actuation of said pressing means to render said conveyor means inoperative whereby said second control means renders said moving means and said pressing means inoperative, to thus reactuate said conveyor means, and fourth control means operatively associated with said second control means to cause a delay in rendering said moving means and said pressing means inoperative.

6. A pressing device for pressing both sides of a textile article at a plurality of stations, comprising spaced first and second pressing means, conveyor means for moving articles to a first pressing station in alignment with said first pressing means adapted to press one side of each article and then to a second pressing station in alignment with said second pressing means adapted to press the other side of each article, means disposed along said conveyor means and between said first and second pressing means for turning the articles over, automatic means operating said device to intermittently actuate said conveyor means, said pressing means, and said moving means, said automatic means including first control means for initiating operation by actuating said conveyor means, second control means responsive to actuation of said conveyor means to actuate said moving means and said pressing means, third control means responsive to actuation of said pressing means to render said conveyor means inoperative whereby said second control means renders said moving means and said pressing means inopertive, to thus reactuate said conveyor means, and fourth control means operatively associated with said second control means to cause a delay in rendering said moving means and said pressing means inoperative.

References Cited in the file of this patent
UNITED STATES PATENTS

| | | |
|---|---|---|
| 1,825,727 | Hahn | Oct. 6, 1931 |
| 2,790,533 | Osgood | Apr. 30, 1957 |
| 2,829,759 | Parker | Apr. 8, 1958 |